US012566725B1

(12) United States Patent
Davidson et al.

(10) Patent No.: US 12,566,725 B1
(45) Date of Patent: Mar. 3, 2026

(54) IDENTIFYING REDUNDANT, OBSOLETE AND/OR TRIVIAL DATA FOR AUTOMATED COLD TIERING

(71) Applicant: Dell Products L.P., Round Rock, TX (US)

(72) Inventors: Michal Davidson, Beit Shemesh (IL); Anat Parush Tzur, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/902,782

(22) Filed: Sep. 30, 2024

(51) Int. Cl.
| | |
|---|---|
| *G06F 16/00* | (2019.01) |
| *G06F 16/11* | (2019.01) |
| *G06F 16/16* | (2019.01) |
| *G06F 16/174* | (2019.01) |

(52) U.S. Cl.
CPC .......... *G06F 16/113* (2019.01); *G06F 16/168* (2019.01); *G06F 16/1748* (2019.01)

(58) Field of Classification Search
None
See application file for complete search history.

(56) References Cited

U.S. PATENT DOCUMENTS

| | | | | |
|---|---|---|---|---|
| 9,047,189 | B1 * | 6/2015 | Gupta | G06F 3/064 |
| 9,830,471 | B1 * | 11/2017 | Rokicki | G06F 21/6236 |
| 11,531,640 | B1 * | 12/2022 | Woodward | G06F 3/0604 |
| 2010/0017444 | A1 * | 1/2010 | Chatterjee | G06F 16/10 |
| | | | | 707/E17.007 |

| | | | | |
|---|---|---|---|---|
| 2012/0109907 | A1 * | 5/2012 | Mandagere | G06F 16/215 |
| | | | | 707/E17.005 |
| 2014/0046911 | A1 * | 2/2014 | Roomp | G06F 16/2365 |
| | | | | 707/E17.002 |
| 2014/0201163 | A1 * | 7/2014 | Tipton | G06F 11/0706 |
| | | | | 707/686 |

(Continued)

FOREIGN PATENT DOCUMENTS

| | | | | |
|---|---|---|---|---|
| CN | 117112582 | A | * 11/2023 | G06F 16/2379 |

OTHER PUBLICATIONS

Blog (https://www.m-files.com/category/blog/), Stop Wasting Money_ How to Control Data Rot _ M-Files, https://www.m-files.com/how-controlling-data-rot-will-save-your-company-money-3/, 5 pages, Oct. 18, 2022.

(Continued)

*Primary Examiner* — Jean M Corrielus
(74) *Attorney, Agent, or Firm* — Chamberlain, Hrdlicka, White, Williams & Aughtry; Aly Z. Dossa

(57) ABSTRACT

A method for managing data includes: upon identifying a data path activity, analyzing, using a fine-tuned model and a second model, ingested data to generate an evaluation score for the ingested data; making, based on the analyzing, a first determination that the evaluation score exceeds an administrator-defined threshold; making, based on the first determination, a second determination that input of a user is not required before taking an action on the ingested data; initiating, based on the second determination, migration of the ingested data to a storage; initiating, when the ingested data is migrated to the storage, deletion of the ingested data from the data protection system; and initiating, via a graphical user interface (GUI) of a client, notification of the user to indicate that the ingested data is migrated to the storage.

15 Claims, 5 Drawing Sheets

(56) References Cited

U.S. PATENT DOCUMENTS

| | | | |
|---|---|---|---|
| 2016/0119119 A1* | 4/2016 | Calapodescu ....... | G06F 21/6227 |
| | | | 380/30 |
| 2017/0017547 A1* | 1/2017 | Broede ............... | G06F 11/1076 |
| 2020/0005324 A1* | 1/2020 | Upadhyay ............... | G06F 16/13 |
| 2020/0241972 A1* | 7/2020 | Dain ................... | G06F 16/2457 |
| 2022/0414084 A1* | 12/2022 | Pakiteeri ............ | G06F 16/2365 |
| 2023/0334365 A1* | 10/2023 | Nawab ................ | G06F 16/2468 |

OTHER PUBLICATIONS

Ian Hodgkinson et al., On track for 6.8 billion years of continuous movie streaming_ Data, energy & need for digital decarbonization—Observatory of Public Sector Innovation, https://oecd-opsi.org/blog/digital-decarbonization/, 8 pages, Apr. 6, 2023.

* cited by examiner

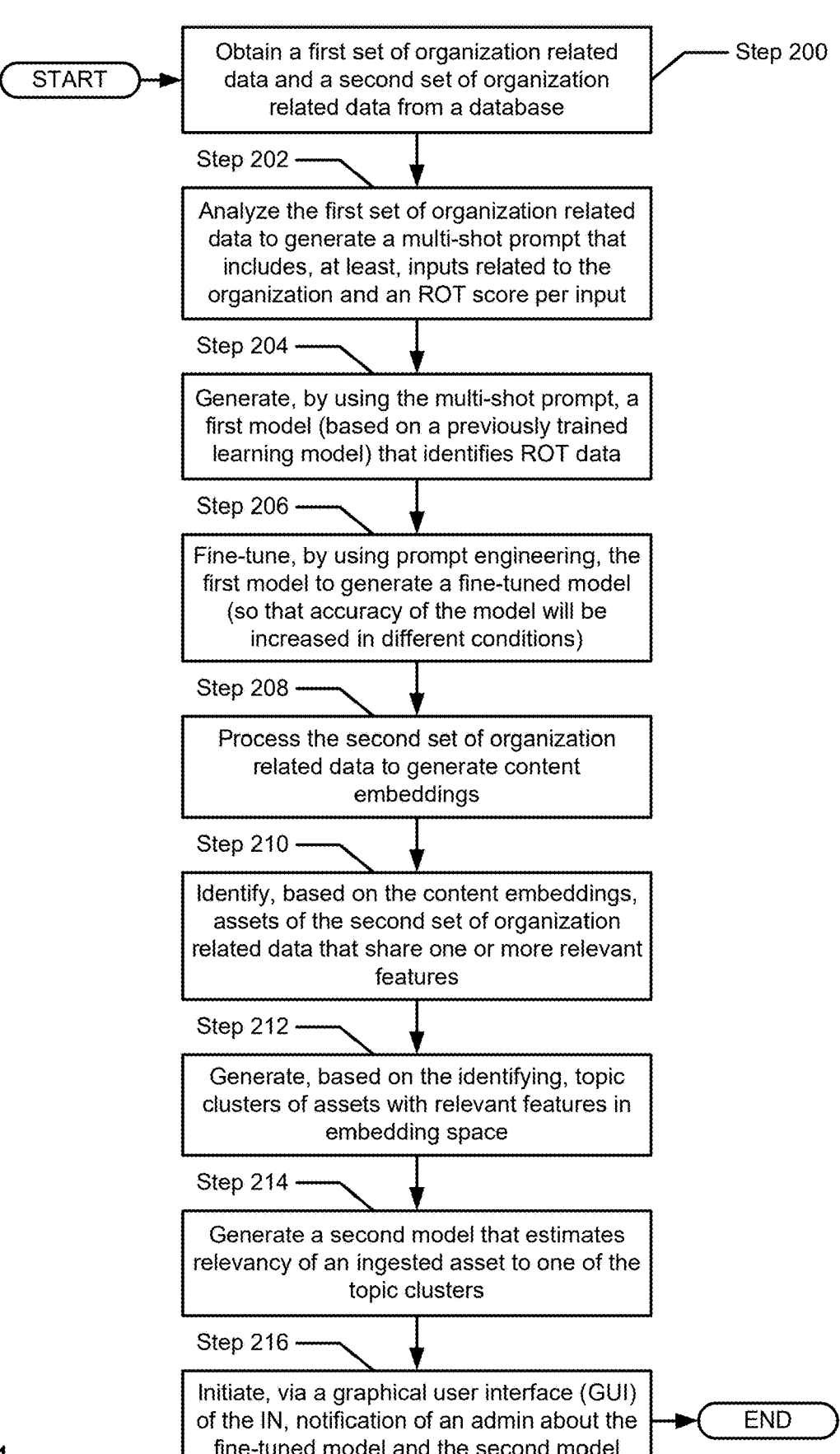

START

Obtain a first set of organization related data and a second set of organization related data from a database ⎯ Step 200

Step 202 ⎯ Analyze the first set of organization related data to generate a multi-shot prompt that includes, at least, inputs related to the organization and an ROT score per input Step 204 ⎯ Generate, by using the multi-shot prompt, a first model (based on a previously trained learning model) that identifies ROT data Step 206 ⎯ Fine-tune, by using prompt engineering, the first model to generate a fine-tuned model (so that accuracy of the model will be increased in different conditions)

Step 208 ⎯ Process the second set of organization related data to generate content embeddings Step 210 ⎯ Identify, based on the content embeddings, assets of the second set of organization related data that share one or more relevant features Step 212 ⎯ Generate, based on the identifying, topic clusters of assets with relevant features in embedding space Step 214 ⎯ Generate a second model that estimates relevancy of an ingested asset to one of the topic clusters Step 216 ⎯ Initiate, via a graphical user interface (GUI) of the IN, notification of an admin about the fine-tuned model and the second model

END

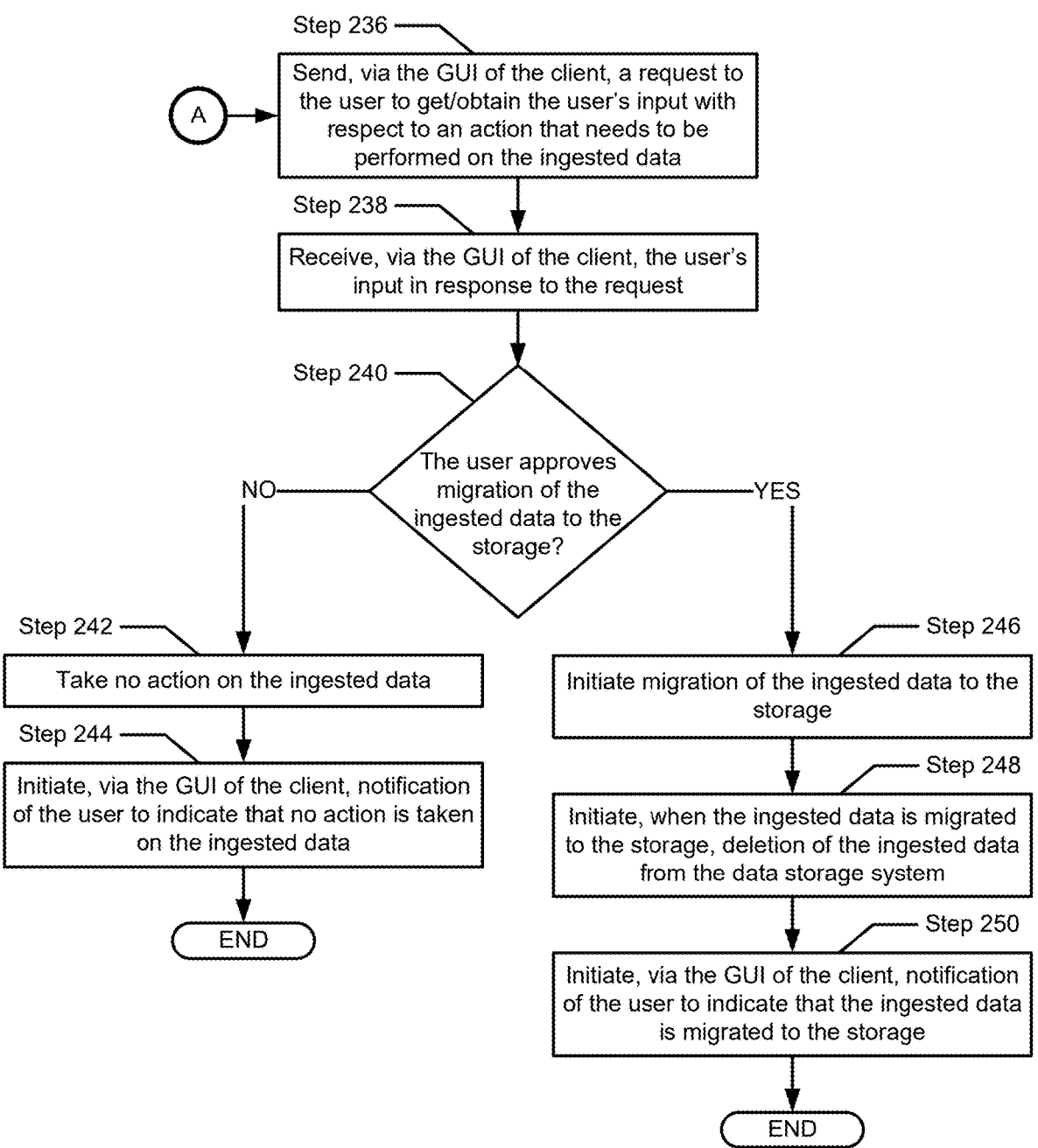

Step 236

Send, via the GUI of the client, a request to the user to get/obtain the user's input with respect to an action that needs to be performed on the ingested data

A

Step 238

Receive, via the GUI of the client, the user's input in response to the request

Step 240

The user approves migration of the ingested data to the storage?

NO

YES

Step 242

Take no action on the ingested data

Step 244

Initiate, via the GUI of the client, notification of the user to indicate that no action is taken on the ingested data

END

Step 246

Initiate migration of the ingested data to the storage

Step 248

Initiate, when the ingested data is migrated to the storage, deletion of the ingested data from the data storage system Step 250

Initiate, via the GUI of the client, notification of the user to indicate that the ingested data is migrated to the storage

END

FIG. 2.3

IDENTIFYING REDUNDANT, OBSOLETE AND/OR TRIVIAL DATA FOR AUTOMATED COLD TIERING

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

DETAILED DESCRIPTION

Figure 1:
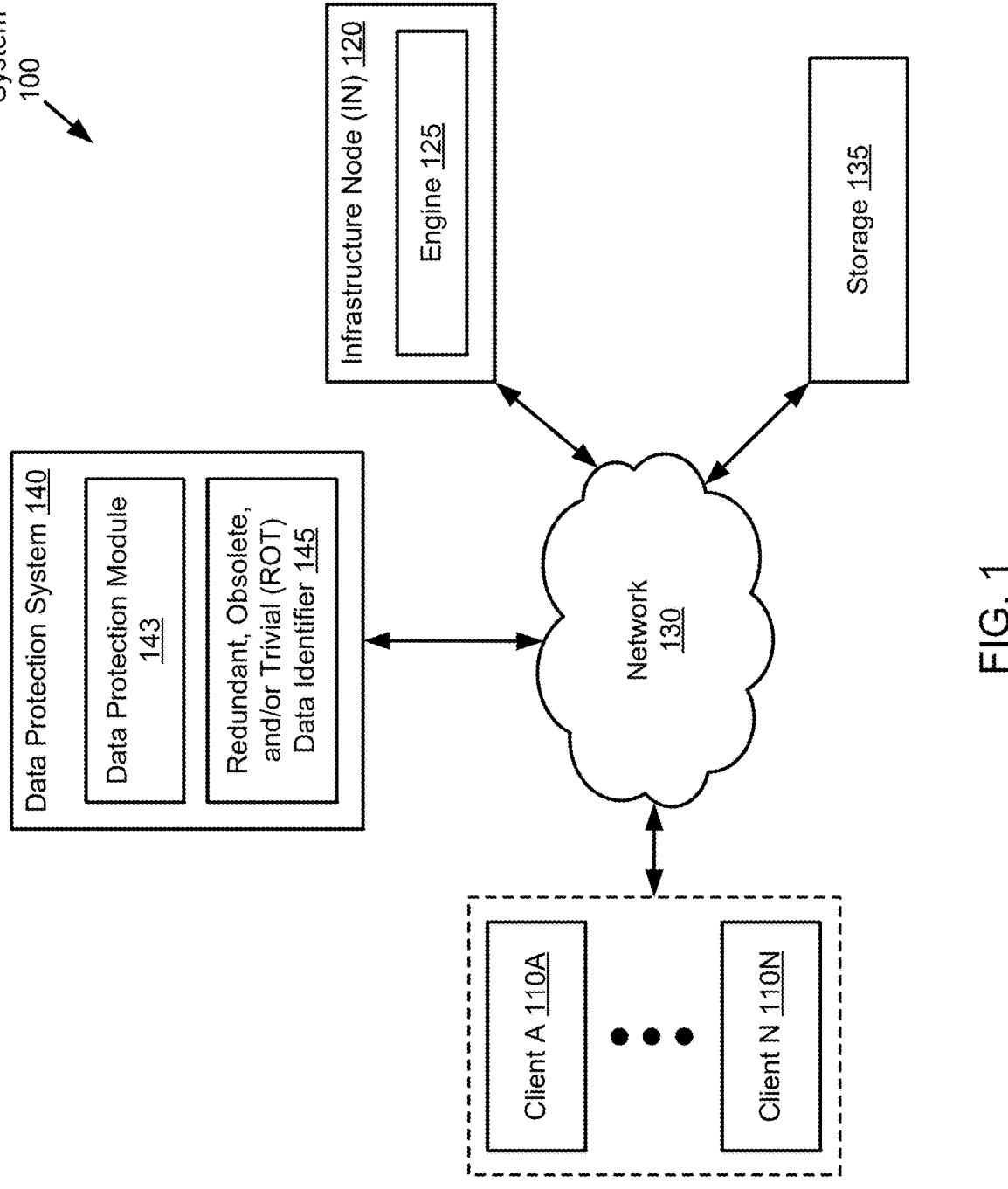
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Recent studies have shown that ROT data may have a major impact on financial performance and environmental performance of, for example, an organization. In general, as one of the challenges in data storage, when ROT data is stored (e.g., to a storage system), the storage system may not be aware of the stored data is indeed ROT data, and thus automating the removal of the ROT data is not a trivial problem. Considering that each organization needs to manage some amount of ROT data in this information age, the human cost of removing ROT data is not cheap.

In order to identify duplication of data in a storage system (e.g., a data protection system), traditional deduplication technologies may be used; however, these technologies may only be used to identify redundant data and when data redundancy is because of data duplication. These technologies may not be suitable to identify (and remove) obsolete and trivial data from a corresponding storage system. For this reason, automated identification of ROT data still relies on a concept-based understanding, which has not previously been automated by storage systems.

Further, recent advancements in language models (e.g., large language models (LLMs)) may support identifying ROT data when the ROT data is processed/analyzed by an external/remote LLM; however, transferring the ROT data to the remote LLM may involve significant networking costs, latency impact, and may pose major security and privacy risks. Remote LLMs may also not be in possession of organization-based attributes, which may be required to identify ROT data that is organization-specific. Said another way, for example, Data X may be ROT data for Organization A, while Data X may be crucial data for Organization B. Non-context based identification of ROT data may cause not only false negatives in identification of ROT data, but also false positives, which may lead to misclassification of critical organization/enterprise data.

For at least the reasons discussed above and without requiring resource-intensive efforts (e.g., time, engineering, etc.), a fundamentally different approach/framework is needed (e.g., a framework (or a storage system) that automates identification of ROT data in order to (i) automate migration of the ROT data to a cold tier storage and/or deletion of the ROT data and (ii) reduce storage costs, infrastructure costs, and/or environmental impact of the ROT data).

Embodiments disclosed herein relate to methods and systems for managing ROT data. As a result of the processes discussed below, one or more embodiments disclosed herein advantageously ensure that: (i) a data protection/storage system is enabled to perform machine learning (ML) related processes internally so that the data protection system can identify ROT data (automatically and internally) and then perform automated migration of the ROT data to a cold tier storage and/or deletion of the ROT data, while reducing storage costs, infrastructure costs, and/or environmental impact associated with the ROT data (e.g., reducing environmental carbon dioxide footprint to store the ROT data); (ii) concerns related to, at least, data privacy, data security, and networking costs (of ROT data) are reduced/minimized by performing ROT data identification (e.g., organization-specific ROT data) within the data protection system; (iii) a hardware and/or software component of the data protection system (that is responsible for the identification of ROT data and cold tiering and/or deletion of the ROT data) is in possession of the organization-based attributes (e.g., in order to identify ROT data that is organization specific); (iv) as being a compact/lightweight component, the component can be executed locally on the data protection system without causing high computing resource utilization on the data protection system; and/or (v) the framework supports customization and continuous adjustments (e.g., of the models employed by the component) to match an organization's definition of ROT data.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (IN) (e.g., 120), a data protection/ storage system (140), and a storage (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (120), the network (130), the data protection system (140), and the storage (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 300, FIG. 3) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 300, FIG. 3) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.)

exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or computing device operated by one or more individuals of (or employed by) an organization. Examples of said individual(s) may include, but not limited to, any organization executive(s) (e.g., chief executive officer (CEO), chief financial officer (CFO), etc.) and any employee(s) in the data management team of the organization (e.g., an administrator). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high-speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 3:
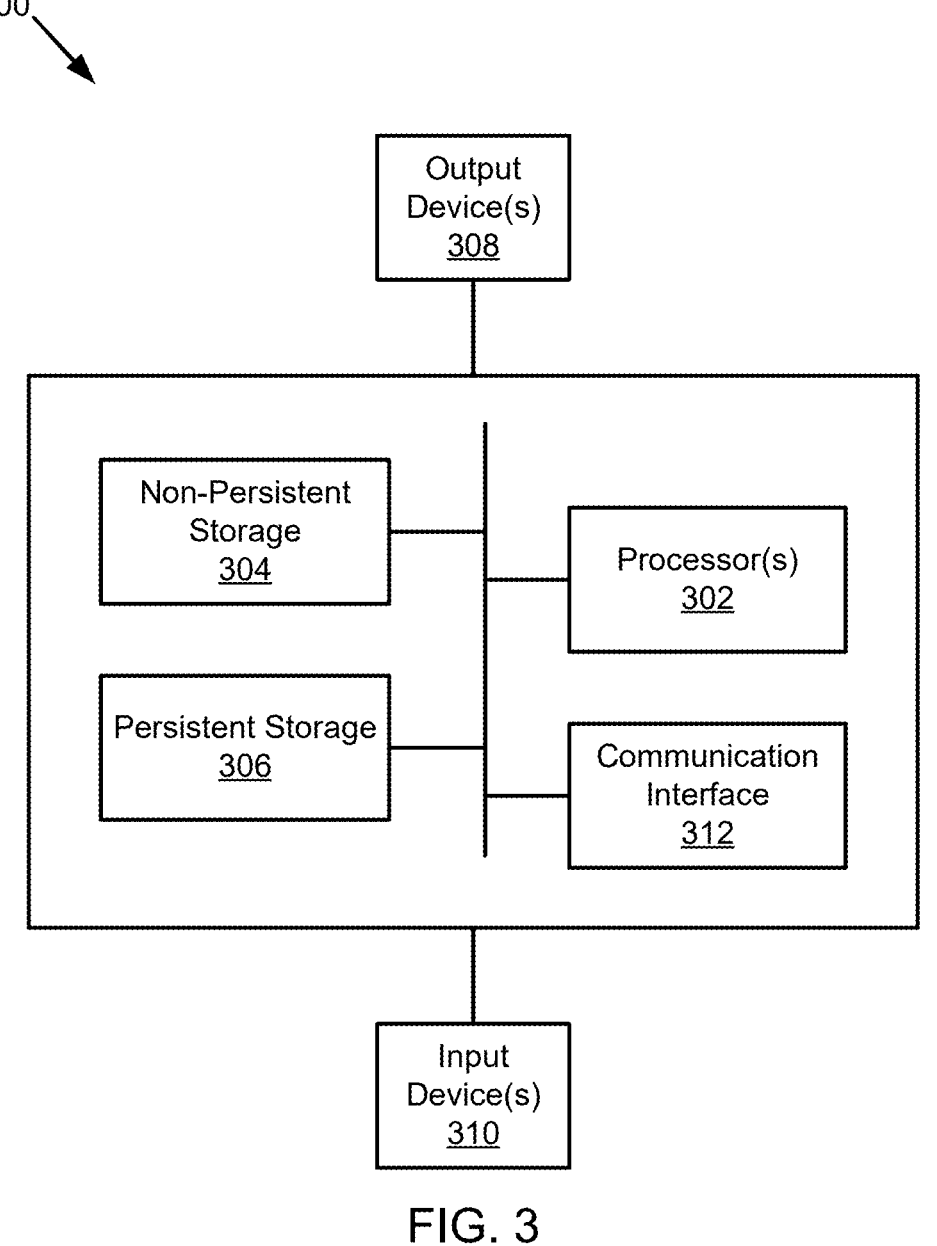
FIG. 3 shows a diagram of a computing device in accordance with one or more embodiments disclosed herein.

Further, in one or more embodiments, a client (e.g., 110A, 110N, etc.) may be implemented as a computing device (e.g., 300, FIG. 3). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 300, FIG. 3) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the storage (135) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or ML models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the storage (135); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (120) may communicate with, for example, the storage (135) and/or other storage devices in the system (100).

As described above, the IN (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high-priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (120) may perform other functionalities without departing from the scope of the embodiments disclosed herein.

In one or more embodiments, the IN (120) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (120) may also be implemented as a logical device.

In one or more embodiments, the IN (120) may host an engine (125). The engine (125) is demonstrated as a part of the IN (e.g., as deployed to the IN); however, embodiments disclosed herein are not limited as such. The engine (125) may be demonstrated as a separate entity from the IN (120) (e.g., as deployed to the data protection system (140)).

In one or more embodiments, the engine (125) may include functionality to, e.g.: (i) obtain/retrieve, at least, a first set of organization related data and a second set of organization related data from a database (not shown); (ii) by employing a set of linear, non-linear, and/or ML models, analyze/process the first set of organization related data to generate a multi-shot prompt (which includes, at least, one or more inputs related to the organization and an ROT score per input); (iii) generate, by using the multi-shot prompt, a first model (based on a previously trained LLM, a single-modal model, a multimodal model, etc.) that identifies ROT data; (iv) fine-tune, by using prompt engineering, the first model to generate a fine-tuned model so that accuracy of the first model will be increased in different conditions (e.g., to identify different types of written data); (v) process the second set of organization related data to generate one or more content embeddings (e.g., embedding vectors, in which these vectors may serve as a second model's semantic understanding of the data); (vi) identify, based on the content embeddings, assets (e.g., files, folders, data, segments, etc.) of the second set of organization related data that share one or more relevant features; (vii) generate, based on the identifying, one or more topic clusters of assets with relevant features in embedding space; (viii) generate the second model that estimates relevancy of an ingested asset to, at least, an asset of one of the topic clusters (e.g., by comparing their semantic similarities through calculation of the distance among these vectors (e.g., using cosine similarity, using weighted average of distances, etc.)); (ix) initiate, via a GUI of the IN (120), notification of an administrator about the fine-tuned model and the second model; and/or (x) deploy the fine-tuned model and the second model to the ROT data identifier (145), in which the ROT data identifier (145) is not suitable to be executed on a block-based storage system (indicating that the data protection system (140) is not a block-based storage system).

As indicated above, generation, adjustment, and/or fine-tuning (e.g., based on an administrator of the data protection system (140)) of the models can be performed by the engine (125) (e.g., outside of the data protection system (140)), when the ROT data identifier (145) is offline.

As used herein, an "embedding" is an ordered collection of numeric values that represents an input to particular embedding space. For example, an embedding may be a vector of floating point or other numeric values that has a fixed dimensionality.

In one or more embodiments, to consider custom data (e.g., input related to the organization) in the first model, an administrator may need to include the custom data in an input prompt (e.g., the multi-shot prompt that (i) includes high-level description of the organization related data, (ii) describes administrator-defined intent and expected output, (iii) includes one or more verified related examples, etc.) before sending the prompt to a model API of the engine (125). To manage the custom data more effectively, the custom data may be transformed into one or more embedding vectors and stored to a vector database (not shown, in which the content embeddings may also be stored to the vector database). These vectors may then be retrieved based on the prompt, and the resulting data may be combined with the prompt to form a newer prompt (e.g., to subsequently invoke the first model in order to obtain responses that consider the custom data).

Despite the generalization capabilities of the first model, issues may arise when applying the first model to use cases that require organization (or business) domain knowledge. For example, in an organization setting with various types of components, if images of these components (e.g., a product catalog) have not been part of the first model's training data, distinguishing these images may be challenging. To prevent that (and/or upon receiving feedback from the administrator indicating that the accuracy of the first model is low/dissatisfactory), the engine (125) may fine-tune the first model to obtain the fine-tuned model. To fine-tune, the engine (125) may (i) request/obtain annotated data sets (e.g., to address specific requirements of a related organization, in which spam communications may be valuable for a cybersecurity organization), (ii) freeze one or more portions of the first model's parameters (e.g., fixing or freezing 80% parameters of the first model during the fine-tuning), (iii) retrain the first model (especially if the organization-specific custom data (e.g., a product catalog) has been updated, the fine-tuned model may need to be re-fine-tuned again); and/or (iv) use in-context learning capabilities of the first model (by, for example, (a) externalizing a custom knowledge base (KB) from model calls, (b) searching for relevant knowledge in the base, (c) rebuilding prompts, and/or (d) recalling the first model).

As indicated above, using/considering feedback (e.g., positive feedback, negative feedback, etc.) received from the administrator as input, via the GUI of the IN (120), may cause the engine (125) to be considered as a closed-loop system because the engine (125) uses feedback in generating models. In light of this, the system (100) may support customization and continuous adjustments (e.g., of the models employed by the ROT data identifier (145)) to match an organization's definition of ROT data.

In one or more embodiments, to customize the framework further (with no human intervention), the engine (125) may process the second set of organization related data to generate content embeddings (e.g., which embed the content of the organization), in which the engine (125) may not have any token limitation in order to analyze/process any type of data (e.g., individual documents, confluence pages, white papers, etc.). As discussed above, after identifying assets (of the second set of organization related data) that share relevant features, the engine (125) may generate topic clusters of assets, in which the engine (125) may be able to separate organization data based on topics (or key organization data domains). Assuming that the engine (125) has a numerical representation(s) (e.g., embeddings) of each relevant topic in the space, the engine (125) may generate the second model that can easily estimate relevancy of an ingested asset (e.g., newer data input) to each topic, by calculating the ingested asset's distance from each topic (or from an asset of each topic cluster).

In one or more embodiments, distance of an ingested asset may be correlated with semantic meaning of its content. For example, Asset A and Asset B may be part of Topic R (e.g., storage system architectures) and thus, their embeddings may be closer to each other (in the embedding space) than embeddings of Asset C and Asset D, because Asset C (e.g., a code file) is part of Topic R and Asset D (e.g., a food review file) is part of Topic Y (e.g., food reviews). As indicated, the engine (125) may embed any input (e.g., textual, image, etc.) to the same embedding space. In one or more embodiments, to make the second model a small footprint model (because the second model will be executed on the data protection system (140)), the engine (125) may consider a small set of representative assets per topic to perform a compact content embedding process (so that the second model may estimate relevancy of an ingested asset without being computing resource hungry).

In one or more embodiments, the first set of organization related data may include, for example (but not limited to): information obtained from an organization's website, information specified in a product portfolio/catalog, information obtained from the organization's KB assets, a technical support history documentation of a customer/user, a port's user guide, a port's release note, a community forum question and its associated answer, a catalog file of an application upgrade, details of a compatible OS version for an application upgrade to be installed, a solution or a workaround document for a software failure, etc.

Further, the second set of organization related data may include, for example (but not limited to): information obtained from a user guide of a product, information obtained from a white paper related to the product, information obtained from a set of confluence pages related to a second product, etc. In one or more embodiments, the relevant features may include, for example (but not limited to): an identifier of an asset, a type of the asset, a size of the asset, a version of the asset, a user level (e.g., a high-priority trusted user) of the user who has access to the asset, a sensitivity score of the asset, details of an access control list (ACL) associated with the asset, profile details of a user who generated the asset, etc.

As discussed below, an ROT data identifier (145) (which is not suitable to be executed on a block-based storage system) may use capabilities of the fine-tuned model and the second model to identify, at least, (i) ROT data and (ii) data (which may be ROT data) that is being distant (e.g., irrelevant), based on its content/context embedding(s), from organization related data (e.g., the first set of organization related data, the second set of organization related data, etc.). For example, if the organization related data specifies/includes collector-debtor related data, ingested hotel management related data (e.g., a file about beverage options) may be considered as distant data (where the file may be highly relevant for an organization that provides hospitality services).

Said another way, the ROT data identifier (145) may have the functionality to identify generic and cross-domain ROT data (e.g., ingested spam data/communications and cross-organization communications (e.g., marketing messages), which (i) are classified as generic, non-context dependent redundant data and (ii) have typical attributes that apply across organizations) (by employing the fine-tuned model) and then refine the identification results by adding/considering organization-specific information (e.g., organization related data) via content embeddings and topic clusters (by employing the second model). This combined approach may allow the ROT data identifier (145) to identify/classify ingested data (e.g., data that is recently written to the data protection system (140)) as either relevant or irrelevant to the organization related data to make more refined ROT data identification.

In one or more embodiments, after the fine-tuned model and the second model are deployed to the ROT data identifier (145), an administrator of the data protection system (140) may be able to input specific data into the ROT data identifier (145) and may request that data to be classified as ROT data. To this end, the ROT data identifier (145) (via the fine-tuned model) may increase a corresponding ROT score of an ingested asset/data that matches one or more details of the specific data. The ROT data identifier (145) may perform this adjustment in order to decrease the number of ROT false negatives.

Similarly, after the fine-tuned model and the second model are deployed to the ROT data identifier (145), the administrator of the data protection system (140) may be able to input second specific data into the ROT data identifier (145) and may request that data to receive a low ROT score. To this end, the ROT data identifier (145) (via the fine-tuned model) may decrease a corresponding ROT score of an ingested asset/data that matches one or more details of the second specific data. The ROT data identifier (145) may perform this adjustment in order to decrease the number of ROT false positives.

One of ordinary skill will appreciate that the engine (125) may perform other functionalities without departing from the scope of the embodiments disclosed herein. The engine (125) may be implemented using hardware (e.g., any number of integrated circuits for processing computer readable instructions), software (e.g., a computer program executing on the underlying hardware of the IN (120)), or any combination thereof.

In one or more embodiments, the database may provide long-term, durable, high read/write throughput data storage/protection with near-infinite scale and low-cost. The database may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database may also occupy a portion of a physical storage/memory device or, alternatively, may span across multiple physical storage/memory devices.

In one or more embodiments, the database may be implemented using physical devices that provide data storage services (e.g., storing data and providing copies of previously stored data). The devices that provide data storage services may include hardware devices and/or logical devices. For example, the database may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database may include a memory device (e.g., a dual in-line memory device), in which data is stored and from which copies of previously stored data are provided. As yet another example, the database may include a persistent storage device (e.g., an SSD), in which data is stored and from which copies of previously stored data is provided. As yet another example, the database may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (and, indirectly, the first and second sets of organization related data) may store/log/record unstructured and/or structured data and/or metadata that may include (or specify), for example (but not limited to): (user provided) custom data (e.g., domain custom knowledge (referring to knowledge with a correspondence(s) between text/query/request and images, mostly in the form of a product catalog/manual), a physical product/object catalog (e.g., a ".pdf" formatted product manual), a logical product/object catalog, a domain custom KB, etc.), a data schema, information/explanation with respect to what kind of data is stored in the database, an identifier (or a model name) of a product, material information of a product, shape information of a product, surface treatment information of a product, a size of a product, usage description associated with a product, an image path associated with a product's image, historical product data and its corresponding details, information regarding a sender (e.g., a malicious user, a high-priority trusted user, a low-priority trusted user, etc.) of custom data, information regarding the size of custom data (or data packets of the custom data), a cumulative history of user activity records obtained over a prolonged period of time, a cumulative history of network traffic logs obtained over a prolonged period of time, previously received malicious data access/retrieval requests from an invalid user, a backup history documentation of a workload, a version of an application, a product identifier of an application, an index of an asset, recently obtained customer/user information (e.g., records, credentials, etc.) of a user, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, etc.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the database may provide an indexing service (e.g., a registration service). That is, data may be indexed or otherwise associated with registration records (e.g., a registration record may be a data structure that includes information (e.g., an identifier associated with data) that enables the recorded data to be accessed). More specifically, an agent of the database may receive various data related inputs/queries directly (or indirectly) from Client A (110A). Upon receiving, the agent may analyze those inputs to generate an index(es) for optimizing the performance of the database by reducing a required amount of database access(es) when implementing a request (e.g., a data retrieval request). In this manner, requested data may be quickly located and accessed from the database using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data (of the database) may be maintained by, for example, the IN (120). The IN may add, remove, and/or modify those data in the database to cause the information included in the database to reflect the latest version of, for example, product information. The unstructured and/or structured data available in the database may be implemented using, for example, lists, tables, unstructured data, structured data, etc. While described as being stored locally, the unstructured and/or structured data may be stored remotely, and may be distributed across any number of devices without departing from the scope of the embodiments disclosed herein.

While the database has been illustrated and described as including a limited number and type of data, the database may store additional, less, and/or different data without departing from the scope of the embodiments disclosed herein. In the embodiments described above, the database is demonstrated as a remote entity; however, embodiments herein are not limited as such. In one or more embodiments, the database may be a local entity to clients (e.g., 110A, 110N, etc.) or to the IN (120).

One of ordinary skill will appreciate that the database may perform other functionalities without departing from the scope of the embodiments disclosed herein. The database may be implemented using hardware, software, or any combination thereof.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Turning now to the storage (135), the storage (135) may provide long-term, durable, high read/write throughput data storage/protection with near-infinite scale and low-cost. The storage (135) may be a fully managed cloud/remote (or local) storage (e.g., cold tier storage, pluggable storage, object storage, block storage, file system storage, data stream storage, Web servers, unstructured storage, etc.) that acts as a shared storage/memory resource that is functional to store unstructured and/or structured data. Further, the storage (135) may also occupy a portion of a physical storage/memory device or, alternatively, may span across multiple physical storage/memory devices.

In one or more embodiments, the storage (135) may be implemented using physical devices that provide data storage services (e.g., storing data and providing copies of previously stored data). The devices that provide data storage services may include hardware devices and/or logical devices. For example, the storage (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the storage (135) may include a memory device (e.g., a dual in-line memory device), in which data is stored and from which copies of previously stored data are provided. As yet another example, the storage (135) may include a persistent storage device (e.g., an SSD), in which data is stored and from which copies of previously stored data is provided. As yet another example, the storage (135)

may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the storage (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the storage (135) may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A)); a protocol type associated with a port number; computing resource details (including details of hardware components and/or software components) and an IP address of an IN (e.g., 120) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to the IN (120)); one or more points-in-time and/or one or more periods of time associated with a data recovery event; data for execution of applications/services (including IN applications and associated endpoints); corpuses of annotated data used to build/generate and train processing classifiers for trained ML models; linear, non-linear, and/or ML model parameters (e.g., instructions to the engine (125) on how to train and/or fine-tune a model); an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN (e.g., 120); a size of each of the set of assets protected; a number of each type of a set of data protection policies implemented by a user; configuration information associated with the ROT data identifier (145); a job detail of a job (e.g., a data protection job, a data restoration job, a log retention job, etc.) that has been initiated by an IN (e.g., 120); a type of the job (e.g., a non-parallel processing job, a parallel processing job, an analytics job, etc.); information associated with a hardware resource set (discussed below) of the IN (120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the analyzer; a number of errors encountered when handling a job; a documentation that shows how the analyzer performs against an SLO and/or an SLA; information regarding an administrator (e.g., a high-priority trusted administrator, a low-priority trusted administrator, etc.) related to an analytics job; a workflow (e.g., a policy that dictates how a workload should be configured and/or protected, such as a structured query language (SQL) workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing KB article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; a set of ROT data, a set of non-ROT data; etc.

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for the IN (120)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (I2C) for various INs in the system (100)), a configurable storage space option (e.g., a list of disk cloning technologies across one or more INs in the system (100)), a configurable storage input/output (I/O) option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the storage (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer system logs are received, a state of the engine (125) is changed, etc.

While the storage (135) has been illustrated and described as including a limited number and type of data, the storage (135) may store additional, less, and/or different data without departing from the scope of the embodiments disclosed herein. One of ordinary skill will appreciate that the storage (135) may perform other functionalities without departing from the scope of the embodiments disclosed herein.

Turning now to the data protection system (140), the data protection system (140) may include a data protection module (143) and the ROT data identifier (145). The data protection module (143) and the ROT data identifier (145) may be physical or logical devices, as discussed below.

In one or more embodiments, the data protection system (140) may provide long-term, durable, high read/write throughput data storage/protection with near-infinite scale and low-cost. The data protection system (140) may be a fully managed cloud/remote (or local) storage (e.g., pluggable storage, object storage, file system storage, data stream storage, Web servers, unstructured storage, etc.) that acts as a shared storage/memory resource that is functional to store unstructured and/or structured data. Further, the data protection system (140) may also occupy a portion of a physical storage/memory device or, alternatively, may span across multiple physical storage/memory devices.

In one or more embodiments, the data protection system (140) may be implemented using physical devices that provide data storage services (e.g., storing data and providing copies of previously stored data). The devices that provide data storage services may include hardware devices and/or logical devices. For example, the data protection system (140) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the data protection system (140) may include a memory device (e.g., a dual in-line memory device), in which data is stored and from which copies of previously stored data are provided. As yet another example, the data protection system (140) may include a persistent storage device (e.g., an SSD), in which data is stored and from which copies of previously stored data is provided. As yet another example, the data protection system (140) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the data protection system (140) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the data protection module (143) may provide data protection (e.g., data backup, data management, data restore, etc.) services to the IN (120) (or any other component of the system (100)). Data protection services may initiate (e.g., instantiate, execute, etc.) generation and storage of backups (e.g., file-based backups) in the storage (135). Data protection services may also include restoration of the IN (120) (or any other component of the system (100)) to a restoration host (not shown) using the backups stored (temporarily or permanently) in the storage (135).

More specifically, the data protection module (143) may provide data protection services to the IN (120) (or any other component of the system (100)) by orchestrating (or scheduling): (i) generation of backups of the IN (120), (ii) storage of the generated backups of the IN (120) to the storage (135), (iii) consolidation of one or more backup requests to reduce (or to prevent) generation of backups that are not useful for restoration purposes, and/or (iv) restoration of the IN (120) to previous states using backups stored in the storage (135).

Further, to provide the aforementioned services, the data protection module (143) may include functionality to generate and issue instructions to any other component of the system (100). The data protection module (143) may also generate instructions in response to data protection requests from other entities.

In one or more embodiments, the data protection module (143) may generate such instructions in accordance with data protection schedules that specify when a protection needs to be performed. In one or more embodiments, a data protection schedule may lay out specific points in time for a protection to be performed. A data protection schedule may be configured based on a user's recovery point objective (RPO).

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4-hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

One of ordinary skill will appreciate that the data protection module (143) may perform other functionalities without departing from the scope of the embodiments disclosed herein. The data protection module (143) may be implemented using hardware, software, or any combination thereof.

Referring to FIG. 1, the ROT data identifier (145) may be executed locally within the data protection system (140), in which the ROT data identifier (145) may not block data path read/write actions targeting the data protection system (140) (in order not to cause any data path latency). Instead, the ROT data identifier (145) may be configured to be (i) triggered by one or more data path activities and executed asynchronously on recently written/ingested data and/or (ii) executed on the background on all relevant data (e.g., periodically), indicating that identification of ROT data may not be in real-time.

Figure 2:
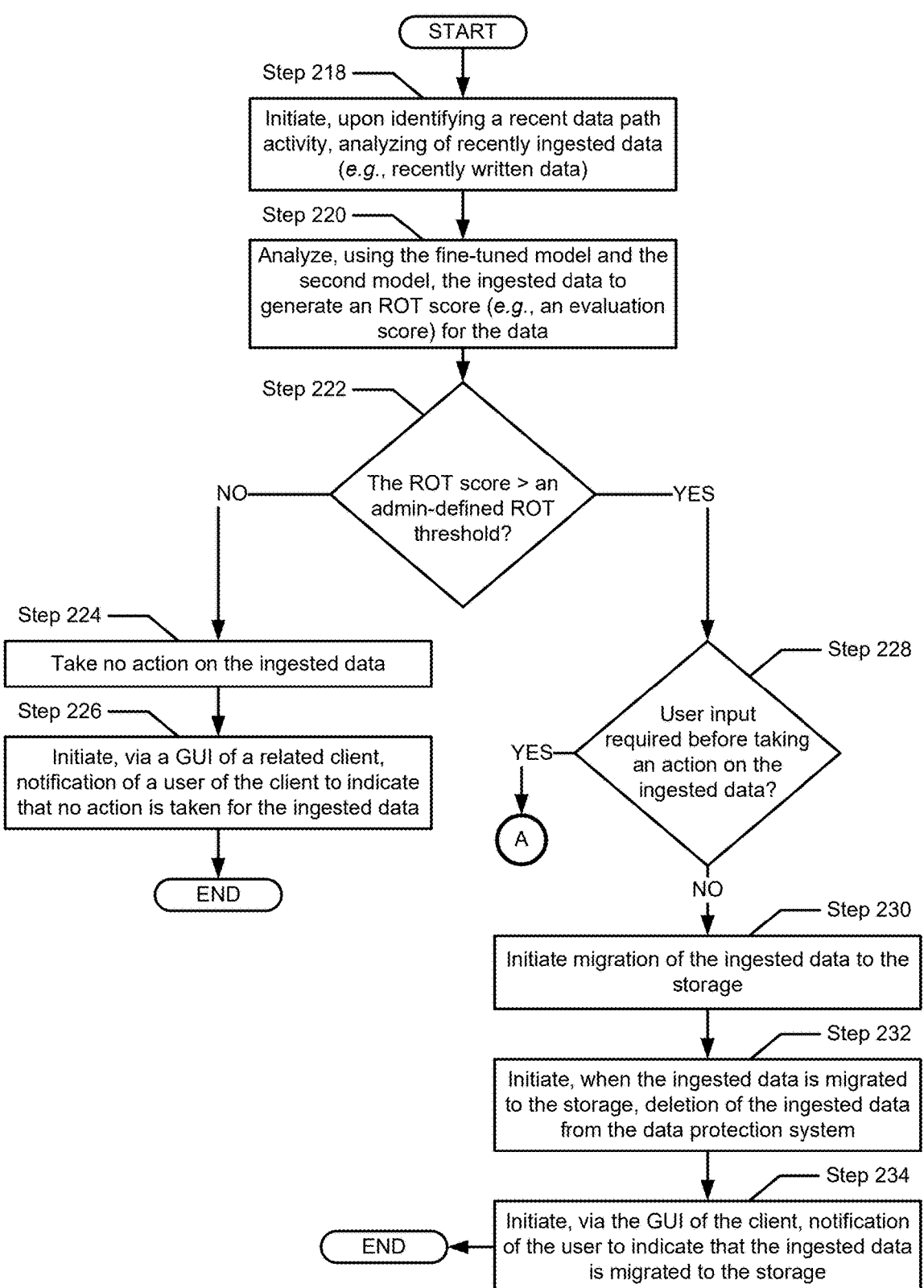
FIGS. 2.1-2.3 show a method for managing redundant, obsolete, and/or trivial (ROT) data in accordance with one or more embodiments disclosed herein.

In one or more embodiments, the ROT data identifier (145) may perform the method illustrated in FIGS. 2.2-2.3 (by using the underlying computing resources of the data protection system (140)). One of ordinary skill will appreciate that the ROT data identifier (145) may perform other functionalities without departing from the scope of the embodiments disclosed herein. The ROT data identifier (145) may be implemented using hardware, software, or any combination thereof.

While FIG. 1 shows a configuration of components, other system configurations may be used without departing from the scope of the embodiments disclosed herein.

FIGS. 2.1-2.3 show a method for managing ROT data in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 2.1, the method shown in FIG. 2.1 may be executed by, for example, the above-discussed engine (e.g., 125, FIG. 1). Other components of the system (100) illustrated in FIG. 1 may also execute all or part of the method shown in FIG. 2.1 without departing from the scope of the embodiments disclosed herein.

In Step 200, the engine obtains/retrieves, at least, the first set of organization related data and the second set of organization related data from the database. Details of the first set of organization related data and the second set of organization related data are described above in reference to FIG. 1.

In one or more embodiments, before obtaining the aforementioned data, the engine may invoke the database to communicate with the database. After receiving the database's confirmation, the engine may obtain the aforementioned data from the database. The aforementioned data may be obtained continuously or at regular intervals (e.g., every two minutes) (without affecting production workloads of the database and the engine). Further, the aforementioned data may be access-protected for the transmission from, for example, the database to the engine, e.g., using encryption.

In one or more embodiments, the aforementioned data may be obtained as it becomes available or by the engine polling the database (via one or more API calls) for newer information. For example, based on receiving an API call from the engine, the database may allow the engine to obtain newer information.

In Step 202, upon receiving the first set of organization related data and by employing a set of linear, non-linear, and/or ML models, the engine analyzes/processes the first set of organization related data to generate a multi-shot prompt (which includes, at least, one or more inputs related to the organization and an ROT score (e.g., an evaluation score) per input). In Step 204, by using the multi-shot prompt, the engine generates the first model (based on a previously trained LLM (e.g., a supervised learning model), a single-modal model, a multimodal model, a reinforcement model, etc.) that identifies ROT data.

In Step 206, by using prompt engineering, the engine fine-tunes the first model to generate the fine-tuned model so that accuracy of the first model will be increased in different conditions (e.g., to identify/classify different types of written data as ROT data or non-ROT data). In one or more embodiments, the engine may also fine-tune the first model to support customization and continuous adjustment of the first model to comply with a related organization's definition of ROT data.

In Step 208, upon receiving the second set of organization related data and by employing a set of linear, non-linear, and/or ML models (e.g., a single modality embedding transform model, a multimodal embedding transform model, etc.), the engine processes the second set of organization related data to generate one or more content embeddings (or any types of embeddings). In Step 210, based on the content embeddings (generated in Step 208), the engine identifies assets of the second set of organization related data that share one or more relevant features. Details of the relevant features are described above in reference to FIG. 1.

In Step 212, based on the identifying (performed in Step 210), the engine generates one or more topic clusters of assets with relevant features in the embedding space. In Step 214, assuming that the engine has an embedding(s) of each relevant topic in the space, the engine generates the second model that can easily estimate relevancy of an ingested asset (e.g., newer data input) to one of the topic clusters (or to, at least, an asset of one of the topic clusters), by calculating the ingested asset's distance from each asset. For example, a file about beverage options may be ROT data for a technology organization, but that file may be highly relevant for a hospitality organization.

In Step 216, via the GUI (or an API, a programmatic interface, a communication channel, a visualizer, etc.) of the IN (e.g., 120, FIG. 1), the engine initiates notification of an administrator (of the IN) about the fine-tuned model and the second model. In one or more embodiments, the GUI may employ a set of subroutine definitions, protocols, and/or hardware/software components for enabling/facilitating communications between the engine and external entities such that the external entities may perform data item search and/or retrieval (with minimum amount of latency (e.g., with high-throughput and sub-ms latency)). Thereafter, the engine may deploy the fine-tuned model and the second model to the ROT data identifier (e.g., 145, FIG. 1) (or to the data protection/storage system (e.g., 140, FIG. 1)). In one or more embodiments, the method may end following Step 216.

In one or more embodiments, Step 216 may be performed without notifying the administrator (e.g., without requiring the administrator's review).

Turning now to FIG. 2.2, the method shown in FIG. 2.2 may be executed by, for example, the above-discussed ROT data identifier (after the fine-tuned model and the second model are deployed to the ROT data identifier). Other components of the system (100) illustrated in FIG. 1 may also execute all or part of the method shown in FIG. 2.2 without departing from the scope of the embodiments disclosed herein.

In Step 218, upon identifying a recent data path activity that is occurred in the data protection system, the ROT data identifier initiates analyzing of recently ingested data (e.g., recently written data, through the data path activity, to the data protection system) (and/or any data in the data protection system). In one or more embodiments, based on an admin/user's request, the ROT data identifier may initiate batch analyzing of historically ingested data after a period of time has passed (e.g., after 11:00 p.m. every day, (periodically) once a week at 11:50 p.m., etc.) for not slowing down other processes performed by the data protection system and for improving experience of the user with the data protection system. As indicated, the administrator of the data protection system may configure the trigger points for the ROT data identifier to perform ROT data identification/classification.

In one or more embodiments, input to the ROT data identifier may need to be a file, folder, or an object so that the ROT data identifier may generate an ROT score (e.g., an evaluation score) per file, folder, or object. As discussed above in reference to FIG. 1, the ROT data identifier may not be executed directly on block-based storage systems (which means the data protection system is not a block-based storage system) because block-based storage systems may not be able to natively classify data at a file, folder, or object level.

In Step 220, (i) upon identifying the recent data path activity and (ii) by employing the fine-tuned model and the second model, the ROT data identifier analyzes the ingested data to generate an ROT score for the ingested data (e.g., organization-specific ROT data). In one or more embodiments, the ROT data identifier may generate the ROT score by combining (using, for example, linear regression) relevancy of the ingested data to one of the assets (of a topic cluster), based on its distance to that asset, and output of the fine-tuned model with respect to the ingested data.

In one or more embodiments, the ROT data identifier may generate/calculate the ROT score of the ingested data by considering, at least, raw information within (or actual content of) the ingested data and metadata/logs associated with the ingested data, in which the metadata may include valuable details (e.g., data is five-year old, data is obtained from an unknown source, etc.) that may affect the ROT score of the ingested data. To this end, while generating the ROT score, the ROT data identifier may implement collaborative filtering.

In one or more embodiments, the ROT score may be between, for example, 0-100, in which "0" may represent that the ingested data is not ROT data (i.e., highly valuable and unique data) and "100" may represent that the ingested data is ROT data.

In Step 222, the ROT data identifier makes a first determination (in real-time or near real-time) as to whether the ROT score (of the ingested data) is greater than an administrator-defined ROT threshold (or score threshold) (e.g., if the ROT score of the ingested data is greater than 45, the ingested data should be classified as ROT data and be migrated to a cold tier storage (and, then, be deleted from the data protection system)). Accordingly, in one or more embodiments, if the result of the first determination is NO, the method proceeds to Step 224. If the result of the first determination is YES, the method alternatively proceeds to Step 228.

In one or more embodiments, the ROT data may be deleted directly (e.g., based on the preference of a user/administrator), without first being migrated to a cold tier storage system.

In Step 224, as a result of the first determination in Step 222 being NO, the ROT data identifier takes no action on the ingested data, which means the ingested data may be stored and/or processed in the data protection system. In Step 226, via the GUI of a related client (e.g., 110A, FIG. 1), the ROT data identifier initiates notification of a user (of the client) to indicate that no action is taken on/for the ingested data. In one or more embodiments, the method may end following Step 226.

In Step 228, as a result of the first determination in Step 222 being YES, the ROT data identifier makes a second determination (in real-time or near real-time) as to whether user input/review is required prior to taking an action on the ingested data. Accordingly, in one or more embodiments, if the result of the second determination is NO, the method proceeds to Step 230. If the result of the second determination is YES (indicating that non-recoverable actions, such as data deletion, can be prevented), the method alternatively proceeds to Step 236 of FIG. 2.3.

In Step 230, as a result of the second determination in Step 228 being NO, the ROT data identifier initiates migration of the ingested data (because the ingested data is identified as ROT data) to the storage (e.g., 135, FIG. 1), for example, in order to reduce storage costs and environmental impact of the ingested data (while supporting restoration of the data (from the storage) if identified as needed, following the migration). In Step 232, when the ingested data is migrated to the storage, the ROT data identifier initiates deletion of the ingested data from the data protection system (said another way, the data storage system), for example, in order to free up storage allocation for this data in the data protection system.

In Step 234, via the GUI of the client, the ROT data identifier initiates notification of the user to indicate that the ingested data is migrated to the storage (and then deleted from the data protection system). In one or more embodiments, the method may end following Step 234.

In one or more embodiments, the method may end without performing Step 234 (e.g., without requiring the user's review).

Turning now to FIG. 2.3, the method shown in FIG. 2.3 may be executed by, for example, the above-discussed ROT data identifier. Other components of the system (100) illustrated in FIG. 1 may also execute all or part of the method shown in FIG. 2.3 without departing from the scope of the embodiments disclosed herein.

In Step 236, as a result of the second determination in Step 228 of FIG. 2.2 being YES and via the GUI of the client, the ROT data identifier sends a request to the user to get/obtain the user's input (e.g., in an audio form/format or in a textual form) with respect to an action that needs to be performed on the ingested data (by implementing a "confirmation through the GUI" approach). In Step 238, via the GUI of the client, the ROT identifier receives the user's input (which may be converted into a machine-readable format by the GUI) in response to the request (sent in Step 236). In one or more embodiments, the user's input may include, at least, a user-assigned ROT threshold for the ingested data.

In Step 240, for a better user experience, the ROT data identifier makes a third determination (in real-time or near real-time) as to whether the user approves migration of the ingested data to the storage. Accordingly, in one or more embodiments, if the result of the third determination is NO (because the ROT score of the ingested data does not exceed the user-assigned ROT threshold (e.g., 65)), the method proceeds to Step 242. If the result of the third determination is YES, the method alternatively proceeds to Step 246.

In Step 242, as a result of the third determination in Step 240 being NO, the ROT data identifier takes no action on the ingested data (that serves the intent of the user), which means the ingested data may be stored and/or processed in the data protection system. In Step 244, via the GUI of the client, the ROT data identifier initiates notification of the user (of the client) to indicate that no action is taken on/for the ingested data. In one or more embodiments, the method may end following Step 244.

In Step 246, as a result of the third determination in Step 240 being YES, the ROT data identifier initiates migration of the ingested data (that servers the intent of the user) (because the ingested data is identified as ROT data) to the storage, for example, in order to reduce storage costs and environmental impact of the ingested data (while supporting restoration of the data (from the storage) if identified as needed, following the migration). In Step 248, when the ingested data is migrated to the storage, the ROT data identifier initiates deletion of the ingested data from the data protection system (said another way, the data storage system), for example, in order to free up storage allocation for this data in the data protection system.

In Step 250, via the GUI of the client, the ROT data identifier initiates notification of the user to indicate that the ingested data is migrated to the storage (and then deleted from the data protection system). In one or more embodiments, the method may end following Step 250.

In one or more embodiments, the method may end without performing Step 250 (e.g., without requiring the user's review).

As discussed above, (i) the data protection system is enabled to perform ML related processes internally so that the data protection system can identify ROT data (automatically and internally) and then perform automated migration of the ROT data to the storage and/or deletion of the ROT data, while reducing storage costs, infrastructure costs, and/or environmental impact associated with the ROT data, (ii) concerns related to, at least, data privacy, data security, and networking costs are reduced/minimized by performing ROT data identification (e.g., organization specific ROT data) within the data protection system, (iii) the ROT data identifier is in possession of the context and organization-based attributes (e.g., in order to identify ROT data that is organization specific), and/or (iv) as being a compact/light-weight component, the ROT data identifier can be executed locally on the data protection system without causing high computing resource utilization on the data protection system.

Turning now to FIG. 3, FIG. 3 shows a diagram of a computing device in accordance with one or more embodiments disclosed herein.

In one or more embodiments disclosed herein, the computing device (300) may include one or more computer processors (302), non-persistent storage (304) (e.g., volatile memory, such as RAM, cache memory), persistent storage (306) (e.g., a non-transitory computer readable medium, a hard disk, an optical drive such as a CD drive or a DVD drive, a Flash memory, etc.), a communication interface (312) (e.g., Bluetooth interface, infrared interface, network interface, optical interface, etc.), an input device(s) (310), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data, the method comprising:

obtaining a first set of organization related data and a second set of organization related data from a database;

analyzing, using a set of linear and non-linear machine learning models, the first set of organization related data to generate a multi-shot prompt comprising at least an input related to an organization and an evaluation score for the input;

generating, using the multi-shot prompt, a first model that identifies redundant, obsolete, or trivial (ROT) data;

fine-tuning the first model to generate a fine-tuned model;

processing the second set of organization related data to generate embeddings;

identifying, based on the embeddings, assets of the second set of organization related data that share relevant features;

generating, based on the identifying, topic clusters of assets with the relevant features in embedding space; and generating a second model that estimates relevancy of an ingested asset to one of the topic clusters;

in response to generating the second model:

upon identifying a data path activity, analyzing, using the fine-tuned model and the second model, ingested data, to generate an second evaluation score for the ingested data by combining relevancy of the ingested data to one of the assets of a topic cluster of the topic clusters, based on its distance to the asset and an output of the fine-tuned model with respect to the ingested data, wherein, through the data path activity, the ingested data is written to a data protection system;

making, based on the analyzing and in real-time, a first determination that the second evaluation score exceeds an administrator-defined threshold;

making, based on the first determination, a second determination that user confirmation from a user is required before taking an action on the ingested data, where the action is migration of the ingested data to a storage;

sending, via a graphical user interface (GUI) of a client, a request to the user to obtain the user confirmation with respect to the action that needs to be performed on the ingested data;

receiving, via the GUI of the client, the user confirmation in response to the request;

making, based on the user confirmation, a third determination that the action has been approved by the user;

initiating, based on the third determination, migration of the ingested data to the storage; and initiating, when the ingested data is migrated to the storage, deletion of the ingested data from the data protection system.

2. The method of claim 1, wherein the fine-tuning comprises at least one selected from a group consisting of obtaining annotated data sets that address specific requirements of an organization, freezing a plurality of parameters of the first model, and using in-context learning capabilities of the first model.

3. The method of claim 1, wherein the relevant features specifies at least one selected from a group consisting of an identifier of an asset, a type of the asset, a user level of the user who has access to the asset, a sensitivity score of the asset, and details of an access control list associated with the asset.

4. The method of claim 1, wherein the first set of organization related data specifies at least one selected from a group consisting of information obtained from an organization's website, information specified in a product portfolio, and information obtained from the organization's knowledge base assets.

5. The method of claim 1, wherein the second set of organization related data specifies at least one selected from a group consisting of information obtained from a user guide of a product, information obtained from a white paper related to the product, and information obtained from a set of confluence pages related to a second product.

6. The method of claim 1, wherein the evaluation score is calculated by considering, at least, raw information within the ingested data and metadata associated with the ingested data.

7. The method of claim 1, wherein the fine-tuned model and the second model are deployed to the data protection system, wherein the data protection system hosts, at least, a redundant, obsolete, or trivial (ROT) data identifier, wherein the ROT data identifier is not suitable to be executed on a block-based storage system, wherein the ROT data identifier initiates, at least, the deletion of the ingested data from the data protection system.

8. A method for managing data, the method comprising:

obtaining a first set of organization related data and a second set of organization related data from a database;

analyzing, using a set of linear and non-linear machine learning models, the first set of organization related data to generate a multi-shot prompt comprising at least an input related to an organization and an evaluation score for the input;

generating, using the multi-shot prompt, a first model that identifies redundant, obsolete, or trivial (ROT) data;

fine-tuning the first model to generate a fine-tuned model;

processing the second set of organization related data to generate embeddings;

identifying, based on the embeddings, assets of the second set of organization related data that share relevant features;

generating, based on the identifying, topic clusters of assets with the relevant features in embedding space; and generating a second model that estimates relevancy of an ingested asset to one of the topic clusters;

in response to generating the second model:

upon identifying a data path activity, analyzing, using the fine-tuned model and the second model, ingested data, to generate an second evaluation score for the ingested data by combining relevancy of the ingested data to one of the assets of a topic cluster of the topic clusters, based on its distance to the asset and an output of the fine-tuned model with respect to the ingested data, wherein, through the data path activity, the ingested data is written to a data protection system;

making, based on the analyzing and in real-time, a first determination that the second evaluation score exceeds an administrator-defined threshold;

making, based on the first determination, a second determination that user confirmation from a user is required before taking an action on the ingested data, where the action is migration of the ingested data to a storage;

sending, via a graphical user interface (GUI) of a client, a request to the user to obtain the user confirmation with respect to the action that needs to be performed on the ingested data;

receiving, via the GUI of the client, the user confirmation in response to the request;

making, based on the user confirmation, a third determination that migration of the ingested data to a storage has not been approved by the user;

taking, based on the third determination, no action on the ingested data; and initiating, via the GUI of the client, notification of the user to indicate that no action is taken on the ingested data.

9. The method of claim 8, wherein the fine-tuning comprises at least one selected from a group consisting of obtaining annotated data sets that address specific requirements of an organization, freezing a plurality of parameters of the first model, and using in-context learning capabilities of the first model.

10. The method of claim 8, wherein the relevant features specifies at least one selected from a group consisting of an identifier of an asset, a type of the asset, a user level of the user who has access to the asset, a sensitivity score of the asset, and details of an access control list associated with the asset.

11. The method of claim 8, wherein the first set of organization related data specifies at least one selected from a group consisting of information obtained from an organization's website, information specified in a product portfolio, and information obtained from the organization's knowledge base assets.

12. The method of claim 8, wherein the second set of organization related data specifies at least one selected from a group consisting of information obtained from a user guide of a product, information obtained from a white paper related to the product, and information obtained from a set of confluence pages related to a second product.

13. The method of claim 8, wherein the evaluation score is calculated by considering, at least, raw information within the ingested data and metadata associated with the ingested data.

14. The method of claim 8, wherein the fine-tuned model and the second model are deployed to the data protection system, wherein the data protection system hosts, at least, a redundant, obsolete, or trivial (ROT) data identifier, wherein the ROT data identifier is not suitable to be executed on a block-based storage system, wherein the ROT data identifier initiates, at least, the deletion of the ingested data from the data protection system.

15. A method for managing data, the method comprising:

obtaining a first set of organization related data and a second set of organization related data from a database;

analyzing, using a set of linear and non-linear machine learning models, the first set of organization related data to generate a multi-shot prompt comprising at least an input related to an organization and an evaluation score for the input;

generating, using the multi-shot prompt, a first model that identifies redundant, obsolete, or trivial (ROT) data;

fine-tuning the first model to generate a fine-tuned model;

processing the second set of organization related data to generate embeddings;

identifying, based on the embeddings, assets of the second set of organization related data that share relevant features;

generating, based on the identifying, topic clusters of assets with the relevant features in embedding space; and generating a second model that estimates relevancy of an ingested asset to one of the topic clusters;

in response to generating the second model:

upon identifying a data path activity, analyzing, using the fine-tuned model and the second model, ingested data, to generate an second evaluation score for the ingested data by combining relevancy of the ingested data to one of the assets of a topic cluster of the topic clusters, based on its distance to the asset and an output of the fine-tuned model with respect to the ingested data, wherein, through the data path activity, the ingested data is written to a data protection system;

making, based on the analyzing and in real-time, a first determination that the second evaluation score exceeds an administrator-defined threshold;

making, based on the first determination, a second determination that user confirmation from a user is not required before taking an action on the ingested data, where the action is migration of the ingested data to a storage;

initiating, based on the second determination, migration of the ingested data to a storage;

initiating, when the ingested data is migrated to the storage, deletion of the ingested data from the data protection system; and initiating, via a graphical user interface (GUI of a client, notification of the user to indicate that the ingested data is migrated to the storage.

* * * * *